July 15, 1969   F. R. SCHNEIDER   3,456,119
VEHICULAR REMOTE POWER UNIT
Filed July 24, 1967   2 Sheets-Sheet 1
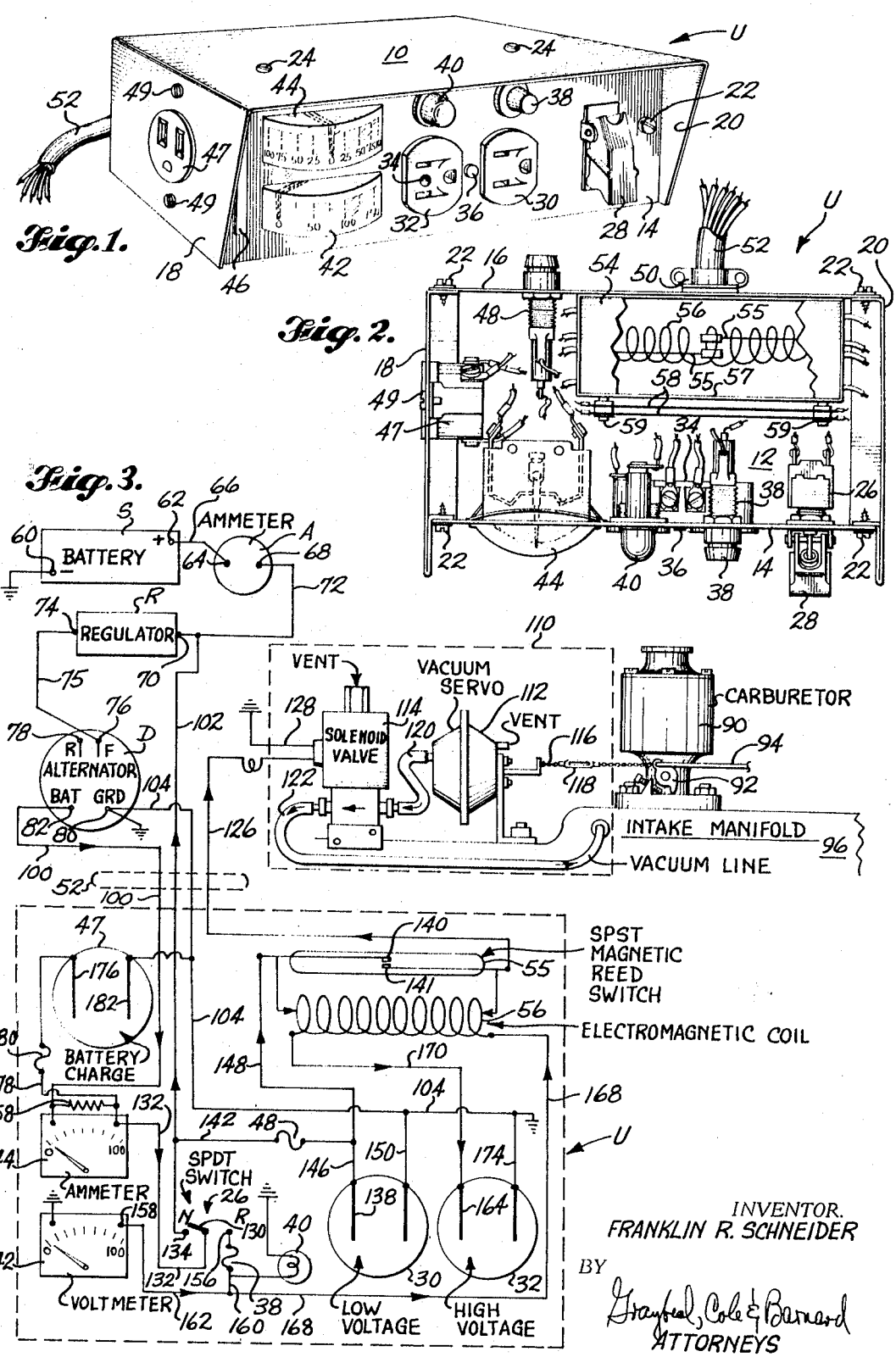
INVENTOR.
FRANKLIN R. SCHNEIDER
BY
Graybeal, Cole & Barnard
ATTORNEYS

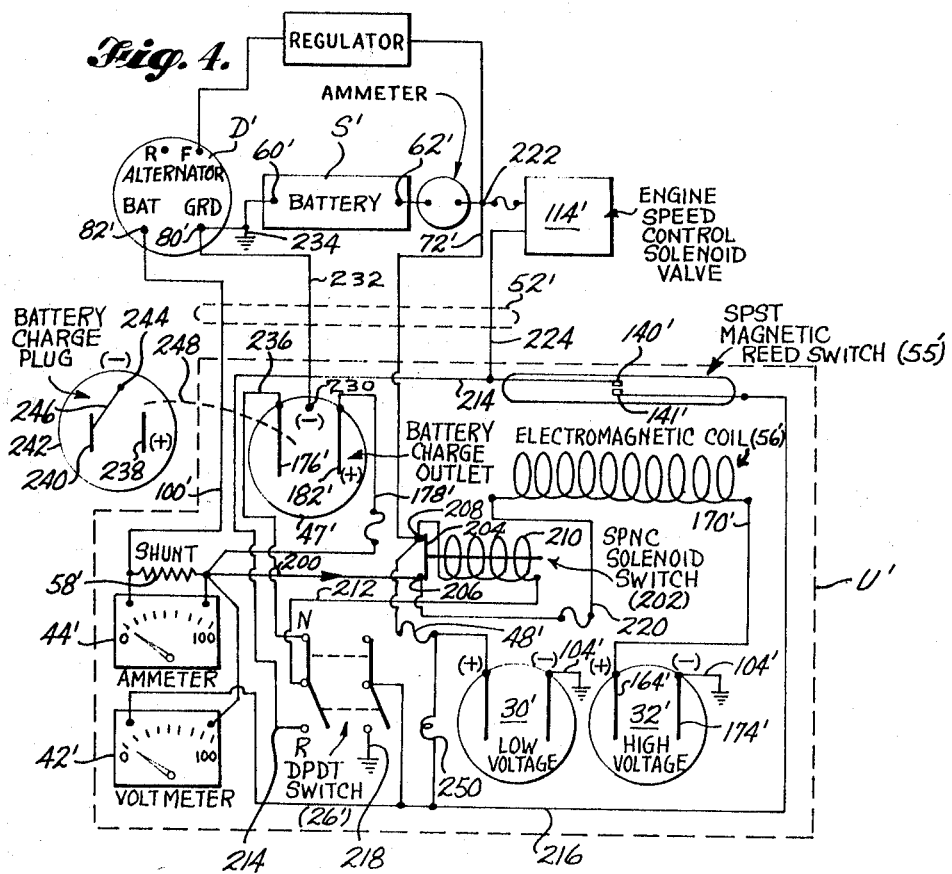

United States Patent Office 3,456,119
Patented July 15, 1969

3,456,119
VEHICULAR REMOTE POWER UNIT
Franklin R. Schneider, Seattle, Wash., assignor to Modern Industries, Inc., Seattle, Wash., a corporation of Washington
Continuation-in-part of application Ser. No. 573,060, Aug. 17, 1966. This application July 24, 1967, Ser. No. 655,631
Int. Cl. H02p 9/04
U.S. Cl. 290—1
26 Claims

ABSTRACT OF THE DISCLOSURE

An electrical power output accessory unit installed in an internal combustion engine powered vehicle for operating portable power tools or the like having relatively high voltage requirements (e.g. 110-120 volts). The unit includes a higher voltage DC outlet which can be selectively connected directly to the engine driven dynamo (e.g. generator or alternator) of the vehicle's electrical system for supplying electrical power to a power tool or the like plugged therein, and is particularly characterized by load responsive control mechanism, including (1) an electromagnetic-pneumatic system for automatically regulating the speed of the engine to maintain dynamo output at a level compatible with the remote load, and also including in one form of the invention, a (2) switching means applying the dynamo output only to the remote load only when the load current exceeds a predetermined value. The engine speed controlling mechanism typically comprises an electromagnetic reed switch in the power output circuit, and controlling a solenoid valve to apply intake manifold vacuum to a vacuum servo motor adjustably linked to the engine throttle. The output switching means is typically a solenoid switch selectively energized by the same electromagnetic reed switch.

RELATED APPLICATION

This application is a continuation-in-part of United States application Ser. No. 573,060, filed Aug. 17, 1966, and entitled Vehicular Remote Power Unit.

BACKGROUND OF THE INVENTION

The present invention relates to a power output accessory unit for installation in an internal combustion engine powered vehicle or the like, to develop from the engine driven dynamo of the vehicle, a higher voltage DC power output for "remote" operation of an electrical power utilization device, such as a 110-120 volt AC-DC power tool or the like.

More particularly, the power output accessory unit of the present invention operates in conjunction with the conventional electrical system of an engine powered vehicle and includes a power operable system which automatically regulates the speed of the engine to provide a DC power output at a voltage adequate for efficient operation of the power tool or the like, and at a current within the design power rating of the engine driven dynamo of the vehicle.

Heretofore, to obtain a higher voltage power output for auxiliary use on or in the vicinity of a vehicle, it is in some instances customary to have a separately operable motor-generator system on the vehicle, or at least a second AC or DC dynamo driven by the vehicle engine in order to provide either a 110-120 volt AC or 110-120 volt DC power output. Either of these systems, involving a second, separate dynamo for the desired remote power output, is relatively expensive, particularly when one considers the mechanical requirements for mounting and driving the second dynamo, and the separate wiring system incident thereto.

Also known is the type of vehicular auxiliary power circuit known generally as converters, which take a relatively low voltage DC input from the vehicle electrical system and convert it to an AC voltage by means of a vibrator or the like (or simply derive an AC output directly from an engine driven AC generator or alternator, as in Snyder U.S. Patent No. 3,174,048), then increase the voltage value to a desired level by step-up voltage transformer means. In any such converter unit there is an inherent power loss in the energy conversion, and the essential step-up power transformer is a necessary and relatively expensive component, particularly when the power output is to satisfy the power demand of power tools or the like having substantial power ratings.

When using converter type remote power sources the factor is also to be considered that many power tools and the like are of the so-called AC-DC type and, while operable on either AC power or DC power, have better performance characteristics when operated from a DC power source at rated voltage.

In a converter type power unit, in order to get a DC power output at rated voltage, it is necessary to convert to AC, then increase the voltage level, then reconvert to DC power by additional rectifier means or the like, which of themselves involve power loss and can be relatively expensive.

Burch U.S. Patent No. 3,293,443 discloses a power accessory unit which includes a remote outlet selectively connectible to the generator of a vehicle's electrical system through a series of manual and power operable switches. However, when using the Burch unit to operate a remote power load having a relatively high voltage requirement (e.g. a 110-120 volt rated power tool), it is necessary to have someone in the vehicle maintaining the speed of the vehicle engine at a level such that the power output from the generator is sufficient to operate the tool. Thus, operation of the remote power load requires at least two operators. The Burch unit is subject to the disadvantage of having limited utility since it provides only a single remote power outlet, and it is relatively complex for the function it performs. It is also subject to the disadvantage that load carrying electrically operated switch means is used, which is inherently unduly complicated and a source of equipment breakdown, and of itself constitutes a substantial power drain on the available electrical energy produced by the vehicle.

SUMMARY OF THE INVENTION

In order to obviate the deficiencies of the conventional power accessory units discussed above, the vehicular power accessory unit of the present invention avoids any power conversion in attaining the desired higher DC voltage level. It also automatically regulates the vehicle engine speed to provide the power output at a DC voltage approximating the rated voltage of the load so that the load is operated efficiently, provides outlets for relatively low voltage loads and battery charging equipment, and includes safeguards as to current drain so as to maintain operation of the vehicle dynamo within its design power rating. In this respect, it has been found that engine driven dynamos in common vehicular usage are readily capable of sustained operation at voltage levels considerably higher than the voltage rating of the vehicle's electrical system, so long as the current drain on the dynamo is small enough to keep the dynamo operating within its design power rating.

Automatic regulation of the engine speed to maintain the DC power output of the dynamo at a level compatible with the power requirements of the tool or other remote load to be operated is accomplished by an electromagnetic-pneumatic system. This system functions in response to the amperage demand of the tool to increase the fuel flow to the engine when the tool is operating.

Protection of the vehicle dynamo and the power tool or the like is provided by means of circuit breaker means in the unit, operable to relieve the dynamo of the load in the event the power drain on the engine driven dynamo substantially exceeds its power rating. The power accessory unit of this invention also has the advantage of having no substantial drain on the battery of the vehicle when operating power tools or the like from the engine driven dynamo, and in one form of the invention also provides for automatic charging of the vehicle battery whenever and for such time as there is no remote power demand. The unit further provides voltmeter means and ammeter means readily viewable by the operator of the vehicle and providing adequate information to the operator for adjusting a suitable control mechanism in the automatic engine speed regulating system to set the remote power output at a level compatible with the power ratings of the loads to be operated.

Yet other advantages and features of the present invention include the flexibility of use thereof for starter voltage tests, general voltmeter testing, and the like.

BRIEF DESCRIPTION OF THE DRAWING

The foregoing and additional objects, features, advantages and characteristics of the type of vehicular remote power accessory units here presented, will be apparent from the following discussion of typical forms thereof, taken together with the accompanying illustrations of a typical unit, wherein like letters and numerals refer to like parts, and wherein:

FIG. 1 is a front perspective view of an encased portion of a remote power accessory unit constructed in accordance with the teachings of the present invention and designed for mounting conjunctively with the instrument panel of a vehicle;

FIG. 2 is a top plan view of the encased unit shown in FIG. 1, with the case broken away and with the various conductors fragmented to more clearly show the physical layout of the unit components; and FIG. 3 is a schematic drawing of the unit of the present invention, including the electrical circuitry of the encased portion of the unit shown in FIGS. 1 and 2 and the automatic engine speed regulating system of the unit showing the internal electrical connections of the encased circuitry, the electrical connections thereof to the electrical system of the associated vehicle and to the engine speed regulating system, and the connections between the speed regulating system and the carburetor and intake manifold of the internal combustion engine which power the vehicle.

FIG. 4 is a schematic drawing of a modified form of the present invention characterized by automatic switchover of the vehicle alternator output to and from vehicle battery charging condition and remote power output condition, responsive to the extent of electrical current drawn by the remote load, such modified form of the invention also comprising an automatic engine speed regulating system such as shown in FIG. 3.

DESCRIPTION OF THE PREFERRED EMBODIMENT

The remote power unit of the present invention includes an encased portion U, shown in FIGS. 1 and 2, having respective top and bottom panels 10, 12, front and rear panels 14, 16, and end panels 18, 20, assembled together by screws 22. In a typical instance, the physical dimensions of such encased unit portion U are 8″ x 5″ x 4″ and, as will be readily understood, such casing can be mounted in any desired position conjunctively with the instrument panel of the associated vehicle, as by being bolted to the underside of the vehicle instrument panel with bolts appropriately passing through the instrument panel undershelf and through holes 24 in the top panel 10. A conventional U-shaped mounting bracket (not shown) can also be employed.

In such typical unit, as shown in FIGS. 1 and 2, front panel 14 mounts a single pole double throw (SPDT) switch 26, which is conventional per se, having a first "normal" position N and a second or "remote" position R, with the "remote" position preferably being guarded by pivotally movable guard 28. Front panel 14 also mounts a double conductor 12 volt DC output receptacle 30, and a double conductor 110–120 volt DC output receptacle 32 (suitably with a distinguishing coding such as provided by red inlay 34), the outlet receptacles 30, 32 being suitably a single subassembly as shown in FIG. 2 at 34, and held in place in the front panel 14 by suitable means such as retainer screw 36. Circuit breaker means, such as fuse 38 in the 110–120 volt output circuit, as well as an indicator light 40, a voltmeter 42, an ammeter 44, and a nameplate 46, are also mounted on the front panel 14. A third double conductor DC output receptacle 47 is mounted on the left end panel 18 by means of retainer screws 49, 49 and is particularly adapted for use in charging batteries and the like.

Rear panel 16 of the encased unit portion mounts 12 volt circuit breaker means such as fuse 48, and the cable retainer 50, through which the electrical conduit cable 52 leaves the unit and leads the various unit conductors to their points of connection to the electrical system of the vehicle, as further discussed below in connection with FIG. 3.

A generally rectangular box 54 is secured in the right rear corner of the encased unit portion U (as viewed in FIG. 2) and encloses a normally open single pole single throw reed switch 55 coaxially mounted in an electromagnetic coil 56. The front wall 57 of the box 54 mounts a pair of parallel shunt plates 58, 58 by means of nut and bolt assemblies 59, 59.

As will be understood, and as shown in FIG. 3, the conventional vehicle electrical system commonly comprises a 12 volt DC storage battery S, an engine driven dynamo D, and a regulator R electrically connected between the battery and the dynamo. The battery S includes a grounded negative terminal 60 and an ungrounded positive terminal 62 connected to the input or battery terminal 64 of the vehicle ammeter A by conductor 66. The ammeter A indicates the current flow to or from the battery and further includes an output terminal 68 connected to the battery terminal 70 of the regulator R by a conductor 72. The regulator R further includes a field winding terminal 74 which is connected through conductor 75 to the field winding terminal 76 of the dynamo D.

The dynamo D, in the example illustrated in FIG. 3, is an AC alternator having built-in rectifier means (not shown) and further includes a relay terminal 78 (adapted to be connected to a conventional indicator light, not shown, on the instrument panel of the vehicle for indicating subnormal current flow in a vehicle not equipped with an ammeter A). Dynamo D further comprises a grounded terminal 80 and a battery related DC output terminal 82. The output terminal 82 is normally connected to the positive terminal 62 of the storage battery S by a conductor (not shown, for the sake of clarity).

The term "dynamo" as used herein relates to a dynamoelectric mechanism for converting mechanical rotation to electrical energy, and is intended to be generic to both DC generators and AC alternators as are in widespread usage in engine driven vehicles. While the conventional vehicle electrical system shown in FIG. 3 is of a type which specifically employs an AC alternator with built-in rectifier means, it will be readily understood that the unit of the present invention may also be employed in a vehicle having a conventional electrical system which employs a DC generator as the engine driven dynamo in conjunction with a voltage regulator having battery, field and armature terminals. An alternator type dynamo is preferable for use in conjunction with the remote power output accessory of the present invention, however, since an alternator has the capability of generating a relatively larger current at lower engine speed.

The vehicle in which the power accessory unit shown in the drawings is installed is powered by a conventional internal combustion engine (not shown) which typically includes a carburetor 90 and an intake manifold 96. A throttle valve 92 is a part of the carburetor 90 and is connected to the accelerator pedal (not shown) inside the vehicle via a link 94.

The power accessory unit of the present invention further includes an automatic engine speed regulating system 110 comprising a vacuum servo motor 112 and a solenoid salve 114. The vacuum servo motor 112 is mechanically coupled to the throttle valve 92 on the carburetor 90 by a chain 116 and a turnbuckle arrangement 118, and is pneumatically coupled to the solenoid valve 114 by a vacuum line 120. The solenoid valve 114, in turn, is pneumatically coupled to the engine intake manifold 96 by a second vacuum line 122, and is electrically connected to one side of the reed switch 55 by a conductor 126. The valve is grounded via a conductor 128.

In installation of the power accessory unit of the present invention on the vehicle, the conductors 66, 72 and 75 between the storage battery S, the ammeter A, the regulator R, and the dynamo D, are left intact, while the normal connection (not shown in FIG. 3) between the dynamo output terminal 82 and the positive battery terminal 62 is removed. In its place a conductor 100 from the unit is connected to the dynamo output terminal 82, and a conductor 102 is connected to terminal 68 of the ammeter A and supplies a 12 volt input to the unit. A unit ground conductor 104 is suitably connected to the grounded terminal 80 of the dynamo D.

With the above unit-to-vehicle connections thus made, the pole 130 of the single pole-double throw switch 26 is connected to the output terminal 82 of the dynamo D through a conductor 132, the ammeter 44 and the conductor 100. With the single pole-double throw switch 26 in what may be termed its first or normal position (as shown in FIG. 3) the pole 130 is in contact with switch contact 134 to which the conductor 102 is connected. In such "normal" position, the usual connection of the storage battery S to the dynamo output terminal 82 is maintained through conductor 100, ammeter 44, conductor 132, pole 130 and conductor 102, and "normal" vehicle operation can proceed. In addition, the battery S is directly connected to the ungrounded conductor 138 of the 12 volt DC output receptacle 30 and to one contact 140 of the reed switch 55 via the unit conductor 102 and conductors 142, 146, and 148. The grounded conductor 150 of the low voltage receptacle 30 is connected to the grounded dynamo terminal 80 via the ground conductor 104. Thus, 12 volt power is available at the unit at all times, such as for the operation of a 12 volt auxiliary light, for example, either separately or in conjunction with operation of a power tool. The battery S is also connected to the solenoid valve 114 via conductors 102, 142, 148 reed switch 55 and conductor 126 when the reed switch is closed.

The fuse 48 or equivalent circuit breaker means is connected in the conductor 142 and may be selected to open circuit under a load of 30 amperes, for example.

Movement of the pole 130 of the switch means 26 from such first or "normal" position N to what may be termed its second or "remote" position R, functions to electrically disconnect the dynamo output terminal 82 from the battery S and to electrically connect the dynamo output circuit to a switch contact 156. The switch contact 156 is connected to the ungrounded terminal 158 of the voltmeter 42 through fuse 38, conductor 160 and conductor 162, and to the ungrounded conductor 164 of the 110–120 volt DC output receptacle 32 through the fuse 38, conductor 160, conductor 168, electromagnetic coil 56 and conductor 170. The second conductor 174 of the 110–120-volt receptacle is grounded via the grounded conductor 104. The fuse 38, or equivalent circuit breaker means, is suitably selected to open circuit at current in excess of 10 amperes, for example. In such second or "remote" position of the switch means 26, the indicator light 40 functions to indicate that the higher voltage output receptacle 32 is "in circuit."

As shown in FIG. 3, the ungrounded conductor 176 of the battery charging receptacle 47 is connected to the dynamo output terminal 82 through a conductor 178, the ammeter 44 and the conductor 100. A fuse 180, or other suitable circuit breaker means (not shown), is connected in conductor 178 and may be selected to break circuit under a load of 30 amperes, for example. The other conductor 182 of the receptacle 47 is grounded by virtue of its connection to the grounded conductor 104.

When a tool or other electrical utilization device is plugged into the 110–120 volt receptacle 32 and turned on, the speed of the vehicle engine is automatically increased by the electromagnetic-pneumatic system 110, in a manner described more fully below, to increase the power output of the dynamo D to a level sufficient to operate the tool. The turnbuckle arrangement 118 is initially adjusted to set the throttle valve 92 at a position such that the engine speed auomatically steps up the power output of the dynamo D to the required level when the tool is operated. Such adjustment is facilitated by referring to the ammeter 44 and the voltmeter 42, both of which are "in circuit" and provide dynamic indications of the output current flow and output voltage when the switch 26 is in its "remote" position.

To illustrate typical operation of a power tool or the like using the installed power accessory unit of the present invention, with the switch in its "normal" position and with the vehicle engine idling, the power cord of a 110–120 volt rated power tool, such as a power saw, is plugged into the 110–120 volt DC outlet receptacle 32. The switch 26 is then moved to the "remote" position and the tool is turned on. By reason of the internal impedance of the load, the power output circuit automatically adjusts to the amperage demand of the tool and the increased current flow through the electromagnetic coil 56 will close the reed switch contacts 140, 141. With the reed switch 55 closed, the battery S is connected to the solenoid valve 114 through conductors 66, 102 and 142, fuse 48, conductor 148, contacts 140 and 141 and conductor 126. The 12 volt DC power from the battery will open the solenoid valve, which in turn establishes pneumatic communication between the vacuum servo motor 112 and the intake manifold 96.

A diaphragm (not shown) in the vacuum servo motor 112 is moved to the left (as viewed in FIG. 3) by the presence of reduced pressure in the line 120, thereby pulling the throttle valve chain 116 to the left and turning the throttle valve 92 to admit additional fuel to the engine. This increases the engine speed to the predetermined level initially set by adjustment of the turnbuckle arrangement 118, thereby stepping the power output level from the dynamo D to a level sufficient to operate the remote load. It has been determined that any DC voltage from about 70 to 110 volts is usually adequate for efficient operation of most power tools rated at 110–120 volts AC–DC, and it has also been observed that the motors of such tools often produce more speed and torque when DC powered than when powered at comparable voltage from a conventional AC voltage source.

When stopping operation of the tool powered from the unit, it is preferable to return to switch 26 from "remote" to "normal" position while the vehicle engine is still running.

As will be readily understood, the load applied to the output from the 110–120 volt receptacle 32 should have a design power rating no greater than the design power rating of the vehicle dynamo D. Thus, for example, if the dynamo D is rated at 600 watts continuous duty or 1200 watts intermittent duty (i.e. 50 amps continuous duty or 100 amps intermittent duty at 12 volts DC), then the power tool or the like receiving power from output receptacle 32 should have a rating no greater that 600 watts continuous duty or 1200 watts intermittent duty (i.e. 5 amps continuous duty or 10 amps intermittent duty at 120 volts DC).

To charge a separate DC battery using the power accessory unit of the present invention, the vehicle engine is run at about one-quarter throttle and a pair of battery charging cables are plugged into battery charge receptable 47. The other ends of the cables are connected to the battery needing charge. When using the unit for battery charging since the load voltage is necessarily not more than about 12 volts DC, the power rating of the dynamo D can tolerate a greater current output than is the case when the output voltage requirement is higher. The voltmeter 42 can be read to give an indication of the charging voltage, and consequently some indication of battery condition, i.e. the absence of presence of short or open battery cells.

The shunt plates 58 (shown schematically as a resistor in FIG. 3) are connected across the conductors 178 and 100 to permit use of a smaller capacity, more conviently sized ammeter 44.

The typical power accessory unit of the present invention presented in FIGS. 1–3 is capable of usages other than those described above. For example, the unit can be used to perform starter voltage tests. With the ignition wiring of the vehicle disconnected, and with connections from the higher voltage output receptacle 32 to the motor terminal of the starter solenoid switch (not shown) and to a good engine ground, when the engine is cranked in the normal manner and the voltage appearing across the output receptacle 32 is observed on the voltmeter 42, an evaluation of the voltage being applied to the starter can be made. As known, a normal starter voltage in a 12 volt DC electrical system is from about 9 to about 10.2 volts, and if the indicated voltage is lower, there is indication of a leaky battery, poor electrical connections, or a dragging starter, for example. As will be apparent, various other dynamic or static electrical system tests can be made directly from the unit by using the output rectptacle 32 as an input to voltmeter 42 since the voltmeter is at all times in circuit across the receptacle conductors 164 and 174.

A modified form of the present invention is shown schematically at FIG. 4, involving automatic changeover of the dynamo output to and from the remote load responsive to the current demand of the remote load.

In the following detailed consideration of the FIG. 4 circuit, it will be understood that this circuit and its manner of operation are in many respects similar to the circuit shown at FIG. 3, and that like circuit elements and system components are designated in FIG. 4 by prime numerals. Thus, it will be observed in FIG. 4 that this modified form of power unit U' utilizes battery S' and dynamo D' of the vehicle equipped with the accessory unit of the invention, and further comprises an engine speed control solenoid valve 114', comparable to valve 114 of FIG. 3, with the further components shown in FIG. 3 and relating to the engine speed control function having been omitted from FIG. 4, for simplicity. The power output assessory unit of FIG. 4 further comprises the following like components; low voltage outlet receptacle 30', high voltage outlet receptacle 32', voltmeter 42', ammeter 44', battery charger outlet 47', ammeter shunt 58', single pole single throw magnetic reed switch 55' and associated electromagnetic coil 56', and the normal-remote manual switch 26', which in this instance is a double pole double throw switch, as shown.

The significant operational feature of the accessory unit schematically shown in FIG. 4, is that, when operated to power a remote load connected to the high voltage outlet receptacle 32', it automatically functions to maintain the alternator D' connected to the service vehicle battery S' and thus tends to maintain the charge of the vehicular battery S' during conditions of no remote load, and also functions to apply the dynamo D' output only to high voltage remote load under the operational condition where the remote power unit presents a substantial power demand. The FIG. 4 circuit is further characterized, not only by automatic changeover of alternator power output to and from vehicular battery and remote load, but also by concurrent automatic control of vehicular engine speed responsive to remote load.

Considering the FIG. 4 circuit more specifically, the "normal" position N of the double pole double throw manual master switch 26' is such that the output from alternator D', appearing on conductor 100' and flowing through the ammeter 44' and its shunt 58', then appears at output conductor 200. A single pole solenoid switch 202, which might also be termed a normally closed single contact relay, comprises a normally closed contact bar 204 in engagement with contacts 206, 208. In the normal operational condition, the dynamo output appearing on conductor 200 flows through contact 206, contact bar 204 and contact 208, then through conductor 72' to terminal 62' of vehicular DC storage battery S'. This circuit condition establishes the normal battery charging circuit for the vehicle, and this circuit remains in operation at all times when the power accessory unit is not in operation, i.e., when the vehicle is in normal use and the manual switch 26' is in its "N" position.

Simply placing the switch 26' in its remote or "R" position does not of itself disturb the above-discussed return of dynamo output to the vehicle storage battery S'. But the "remote" switch position brings into circuit an energization circuit for the solenoid switch 202. This energization circuit involves electrical connection of one end of the solenoid coil 210 through contact 208 and conductor 72' to the storage battery S', and connection of the other end of solenoid coil 210 to ground through conductor 212, the lower left contact of switch 26', conductor 214, the magnetic reed switch 55', conductor 216, and the lower right contact of switch 26', to ground conductor 218. As in the circuit shown in FIG. 3, the magnetic reed switch 55' has normally open contacts 140', 141', and closure of these contacts is responsive to a predetermined current flow (e.g., 1 ampere) through electromagnetic coil 56' in the higher voltage output circuit, i.e., fused conductor 220 from dynamo output conductor 200 to the electromagnetic coil 56', and conductor 170' from the coil 56' to the ungrounded conductor 164' of high voltage outlet receptacle 32'. When the load demands a substantial currrent flow at the high voltage outlet 32', and assuming a previous operating condition with no load and with contact bar 204 of the solenoid switch 202 closed, the initial current flow from the alternator output appearing at conductor 200 (or from storage battery S' via conductor 72' and contact bar 204), flows through the coil 56' and causes closure of the reed switch contacts 140', 141'. The reed switch thus completes the grounding circuit for the solenoid switch 202 and energization of its coil 210 opens contact bar 204, whereupon the dynamo output appearing at conductor 200 is decoupled from the vehicle storage battery S' and is applied only to the remote load through conductor 220, coil 56', and conductor 170'. Substantially simultaneously with the closure of the reed switch contacts 140', 141', the engine speed control solenoid valve 114' is also energized from storage battery S' through fused conductor 222 and the grounded conductor 224. Upon energization, speed control solenoid valve 114' operates in like manner as solenoid valve 114 in FIG. 3, through like associated speed control components (not shown in FIG. 4), to increase engine speed to the predetermined value and increase the output of dynamo D' to an appropriate voltage and current for the particular remote load applied, which voltage and current can be monitored at voltmeter 42' and ammeter 44', as desired.

Presuming the remote load power requirement is interrupted, as by opening of the power switch for the tool or the like, the lessened current flow through electromagnetic coil 56' results in reopening of the normally open contacts 140', 141' of reed switch 55', which circuit interruption in turn deenergizes the speed control solenoid valve 114' (automatically returning the engine speed to idle, for example) and also deenergizes the solenoid switch 202 (reclosing contact bar 204 and re-applying the dynamo output appearing at conductor 200 to the vehicle storage battery S'). Deenergization of the solenoid switch 202 thus restores the dynamo output to its normal function of satisfying the power requirements of the vehicle, including the maintenance of storage battery S' in charged condition. Accordingly, if the vehicle has other load requirements, as is commonly the case with utility or other service vehicles having warning or safety lights, two-way radios, etc., the extended use of the power accessory unit for intermittent remote power load operation does not result in depletion of the vehicle storage battery S' to the point where the normal operation of the vehicle is impaired.

There are, in effect, two parallel control circuits activated responsively to the magnetic reed switch 55'. One such control circuit functions to decouple the dynamo output from the service vehicle battery and applies such output to the remote load. The other control circuit functions to increase engine speed to a predetermined setting to match the alternator output with the power rating of the load.

A third portion of the circuit shown at FIG. 4 has to do with remote battery charging. In order to provide the full output of the dynamo to charge a remote 12 volt DC storage battery, for example, the dynamo output at conductor 200 must be disconnected from the vehicular battery S' so that the dynamo output level is not restricted by the condition of the service vehicle battery S' as determined by the voltage regulator of the vehicle. For this reason, when using the unit for remote battery charging, the solenoid switch 202 is to be manually energized. Remote battery charging of course does not involve use of the high voltage receptacle 32'. The high voltage circuit is not used for remote battery charging because a practical limitation exists with respect to amount of current flow through the electromagnetic coil 56', and because of the desirability of fusing the high voltage output circuit at a lower amperage (in fused line 220) than would be required if the circuit were also used for 12 volt battery charging. Thus, as in the FIG. 3 circuit, a separate battery charging outlet 47' is provided. This outlet is of the type conventional per se comprising jack contacts 176', 182', and also a third, ground contact 230, suitably connected by conductor 232 to a ground point such as ground point 234 to which the ground terminal 80' of the dynamo D' is connected. To manually energize the solenoid switch 202, the double pole, double throw switch 26' is maintained in its normal or "N" position and a conductor 236 is provided between the upper left contact of switch 26' (as shown in FIG. 4) and the contact 176' of the battery charger outlet 47'. The battery charging circuit usable with the accessory unit shown in FIG. 4 can comprise conventional positive and negative charger cables (not shown) connected to the respective positive and negative contacts 238, 240 of the battery charger plug 242. The plug circuit further comprises interconnection of ground contact 240 and the third contact 244, as by conductor 246. With this interconnection, and upon installation of the plug 242 in the outlet receptacle 47' (as diagrammatically designated by the broken line 248), a ground connection is established between contact 230 and contact 176' of the outlet receptacle 47'. This grounding of conductor 236 and also conductor 212 through the closed contact of switch 26', causes energization of the solenoid switch coil 210 through the battery connected conductor 72'. This energization of switch 202 opens the contact bar 204, disconnecting the dynamo output at conductor 200 from the vehicle storage battery S' and is applying such output only to the remote battery being charged, the circuit connection in this instance being through fused conductor 178'.

In that the connection of the dynamo output to the remote battery establishes the output voltage at substantially 12 volts, the charging current is simply manually established at the desired amperage, as reflected by the ammeter 44', by suitable engine speed adjustment. When the dynamo D' is an alternator, a 15–20 ampere output is provided even under an engine-idle condition, which charging rate can oftentimes be adequate for remote battery charging purposes. With regard to the battery charging mode of operation above discussed, it is notable that placement of the switch 26' in its normal position N', removes from the circuit the magnetic reed switch 55' and the associated speed control solenoid valve 114'.

The manual switch 26' serves two distinct purposes, one being a safety purpose in the sense that when this switch is in the normal position and the vehicle is operating under normal conditions, and even though a load were plugged into the higher voltage receptacle 32', the applied load cannot automatically increase engine speed and endanger the vehicle, which might well be in gear and in motion at the time. It is thus not desirable to fully automate the matter of remote load requirement automatically increasing engine speed. The second purpose of the manual switch 26' is to take the magnetic reed switch 55' out of circuit when using the accessory unit for charging a remote battery, because in this mode of operation the preset engine speed which is governing the voltage output for load operation from outlet 32' might well be too high an engine speed (i.e. provide too great a charging current) for the purpose.

In the FIG. 3 circuit, a higher voltage (e.g. 110 volts) indicator light 40 is employed and is effective to indicate the remote load is being powered at approximately rated voltage. In FIG. 4, a lower voltage (i.e. 12 volts) indicator light 250 is employed, and is indicative of simply low voltage circuit energization for remote power delivery, since light 250 and voltmeter 42' are in circuit only with switch 26' in the remote position R, since both indicator light and voltmeter are connected to the ground point 218 only when the switch 26' is in the remote position R.

With respect to the reference in the above description and accompanying claims to a vehicular electrical system wherein the low voltage is 12 volts DC, and to a higher voltage output from the unit of the present invention which approximates a 110–120 volt DC output, it will be understood that these voltage values are dictated by common usage in that most vehicular electrical systems are designed to operate at 12 volts DC, and most power output tools or the like are designed to operate at 110–120 volts AC-DC. However, it will be evident that the unit can be designed with equal facility to operate in conjunction with vehicles having an electrical system of a different, relatively low DC voltage, e.g. 6 volts, 24 volts, or 32 volts, for example; and that the relatively higher voltage obtainable from the unit output receptacle 32 can also be at a different voltage, if desired, since dynamo output voltage is a function of engine speed.

In like manner, the vehicle with which a power accessory unit according to the present invention is used, can be of any engine powered variety, such as automobiles, trucks, tractors, airplanes, and the like. The power accessory unit components can readily be installed as vehicle original equipment, integrated with the other components of the vehicle instrument panel, or otherwise.

As will also be understood, the terms "remote power load" or "power tool or the like" contemplate any of a wide variety of electrically powered devices powered by a DC type motor or an AC-DC type motor, such as motor driven power tools, portable or mobile lighting systems, appliances, air compressors, cement mixers, fluid pumps, etc.

From the foregoing, further variations and adaptations of the present invention will readily occur to those skilled in the art to which the invention is addressed, within the scope of the following claims.

What is claimed is:

1. A power output accessory unit for use in a vehicle of the type powered by an engine having a throttle for controlling the admission of fuel thereto and an intake manifold for distributing air thereto; and having an electrical system including a DC storage battery, an engine driven dynamo with a field winding terminal and an output terminal which normally delivers relatively low voltage DC power to the vehicle electrical system, and a voltage regulator receiving a power input from said DC storage battery and having a field terminal connected to the field winding terminal of said dynamo; said power output accessory unit being designed to provide a power output at the vehicle for operating a remote power load having a relatively high voltage DC power requirement, and comprising:
 (a) a high voltage DC output receptacle having a grounded conductor and an ungrounded conductor;
 (b) double throw switch means movable to either a first position wherein the vehicle battery is electrically connected to the dynamo output for "normal" vehicle operation, or a second position wherein the vehicle battery is selectively automatically connectible to an engine speed control circuit; and
 (c) power operable means responsive to the current flow at said higher voltage DC output receptacle for connecting said vehicle battery in the engine speed control circuit thus controlling the engine speed and the DC power output of said engine driven dynamo under conditions of increased current demand by such power utilization device.

2. A power output accessory unit according to claim 1, further including:
 vacuum motor means operatively connected to the engine throttle for selectively increasing the flow of fuel to the engine;
 vacuum line means including electromagnetic valve means disposed between said vacuum motor means and the intake manifold of the engine for selectively connecting said vacuum motor means to said intake manifold; and
 electromagnetic switch means disposed between said electromagnetic valve means and the vehicle battery and connected to said higher voltage DC output receptacle for electrically energizing said electromagnetic valve means when a power utilization device plugged into said receptacle is operated.

3. A power output accessory unit according to claim 2, wherein:
 said electromagnetic valve means comprises a solenoid valve disposed in said vacuum line between said vacuum motor and the intake manifold of the engine; and
 said electromagnetic switch means comprises a pair of electrical contacts disposed within an electromagnetic coil; one of said contacts being electrically connected to said solenoid valve and the other of said contacts being electrically connected to said DC storage battery; said electromagnetic coil being electrically connected between the ungrounded conductor of said higher voltage DC output receptacle and the engine dynamo when said double throw switch means is in its said second position.

4. A power output accessory unit according to claim 1, further comprising voltmeter means electrically connected to indicate the value of the output DC voltage appearing across the conductors of said higher voltage DC power output receptacle.

5. A power output accessory unit according to claim 1, further comprising ammeter means electrically connected in series flow relation with the said pole of said double throw switch means to dynamically indicate the amount of the current flow to said higher voltage DC power output receptacle when such pole is in its said second position.

6. A power output accessory according to claim 5, wherein said ammeter means is in circuit when the said pole of said double throw switch means is in either its said first position or in its said second position.

7. A power output accessory unit according to claim 1, further comprising a double conductor, low voltage DC power output receptacle with one conductor thereof grounded and the other conductor thereof connected to said DC storage battery so that such low voltage power output receptacle receives relatively low voltage DC power directly from said DC storage battery independently of the position of the pole of said double throw switch means.

8. A power output accessory unit according to claim 1, further comprising a low voltage indicator light, and wherein said pole of said double throw switch means in its said second position establishes electrical connection between the said low voltage indicator light and said output terminal of said dynamo.

9. A power accesory unit according to claim 1, further comprising load sensitive circuit opening means in series circuit arrangement with the ungrounded conductor of said higher voltage DC power output receptacle.

10. A power accessory unit according to claim 7, further comprising load sensitive circuit opening means in series circuit arrangement between said DC storage battery and the ungrounded conductor of said low voltage DC power output receptacle.

11. A power accessory unit according to claim 1, further comprising a double conductor battery charging receptacle having one conductor thereof electrically connected to said output terminal of said dynamo and the other conductor thereof grounded.

12. A power accessory unit according to claim 11, further comprising load sensitive circuit opening means in series circuit arrangement between said output terminal of said dynamo and said ungrounded conductor of said battery charging receptacle.

13. A power output accessory unit according to claim 1, further comprising switch means responsive to the current flow at said higher voltage DC output receptacle and operable to disconnect the dynamo output from the vehicle storage battery and apply the dynamo output only to the higher voltage DC power output receptacle under the operating condition of substantial current flow to the high voltage DC power output receptacle.

14. The power output accessory unit of claim 13, wherein such switch means comprises solenoid switch means having a normally closed contact in circuit between the dynamo output and the vehicle DC storage battery under conditions of relatively small current flow to a remote power load, and also having a solenoid coil energized by substantial current flow in the higher voltage output power circuit, such solenoid coil upon energization causing the said normally closed contact to open.

15. In combination with a vehicle powered by an engine having a throttle for controlling the admission of fuel thereto and an intake manifold for distributing air thereto, and having an electrical system including a DC storage battery, an engine driven dynamo with a field winding terminal and an output terminal which normally delivers relatively low voltage DC power to the vehicle electrical system, and a voltage regulator receiving a power input from said DC storage battery and having a field terminal connected to the field winding terminal of said dynamo; the power output accessory unit claimed in claim 1.

16. In combination with a vehicle powered by an engine having a throttle for controlling the admission of fuel thereto and an intake manifold for distributing air thereto; and having an electrical system including a DC storage battery, an engine driven dynamo with a field winding terminal and an output terminal which normally delivers relatively low voltage DC power to the vehicle electrical system, and a voltage regulator receiving a power input from said DC storage battery and having a field terminal connected to the field winding terminal of said dynamo; the power output accessory unit claimed in claim 14.

17. A power output accessory unit for use in a vehicle of the type powered by an engine having a throttle for controlling the admission of fuel thereto and an intake manifold for distributing air thereto; and having an electrical system including a DC storage battery, an engine driven dynamo with a field winding terminal and an output terminal which normally delivers relatively low voltage DC power to the vehicle electrical system, and a voltage regulator receiving a power input from said DC storage battery and having a field terminal connected to the field winding terminal of said dynamo; said power output accessory unit being designed to provide a power output at the vehicle for operating a remote power load having a relatively high voltage DC power requirement, and comprising:
   (a) a high voltage DC output receptacle having a grounded conductor and an ungrounded conductor;
   (b) double throw switch means movable to either a first position where such dynamo output is electrically connected to the vehicle electrical system for "normal" vehicle operation, or a second position where such dynamo output is automatically, selectively electrically disconnected from the vehicle electrical system and electrically connected to the ungrounded conductor of said high voltage DC power output receptacle for "remote" operation of a remote power load; and
   (c) current responsive switch means in circuit with said high voltage DC output receptacle and operable to disconnect the dynamo output from the vehicle storage battery and apply the dynamo output only to the higher voltage DC power output receptacle under the operating condition of substantial current flow to the high voltage DC power output receptacle.

18. The power output accessory unit of claim 17, wherein such current responsive switch means comprises solenoid switch means having a normally closed contact in circuit between the dynamo output and the vehicle DC storage battery under conditions of relatively small current flow to a remote power load, and also having a solenoid coil energized by substantial current flow in the higher voltage output power circuit, such solenoid coil upon energization causing the said normally closed contact to open.

19. A power output accessory unit according to claim 17, further comprising a double conductor, low voltage DC power output receptacle with one conductor thereof grounded and the other conductor thereof connected to said DC storage battery so that such low voltage power output receptacle receives relatively low voltage DC power directly from said DC storage battery independently of the position of the pole of said double throw switch means.

20. A power accessory unit according to claim 17, further comprising a double conductor battery charging receptacle having one conductor thereof electrically connected to said output terminal of said dynamo and the other conductor thereof grounded.

21. A power accessory unit according to claim 20, further comprising plug means insertable in said battery charging receptacle and comprising a ground connected plug element.

22. In combination with a vehicle powered by an engine having a throttle for controlling the admission of fuel thereto and an intake manifold for distributing air thereto, and having an electrical system including a DC storage battery, an engine driven dynamo with a field winding terminal and an output terminal which normally delivers relatively low voltage DC power to the vehicle electrical system, and a voltage regulator receiving a power input from said DC storage battery and having a field terminal connected to the field winding terminal of said dynamo; the power output accessory unit claimed in claim 17.

23. In combination with a vehicle powered by an engine having a throttle for controlling the admission of fuel thereto and an intake manifold for distributing air thereto, and having an electrical system including a DC storage battery, an engine driven dynamo with a field winding terminal and an output terminal which normally delivers relatively low voltage DC power to the vehicle electrical system, and a voltage regulator receiving a power input from said DC storage battery and having a field terminal connected to the field winding terminal of said dynamo; the power output accessory unit claimed in claim 18.

24. The combination of claim 22, wherein said dynamo is an alternator.

25. In combination with a vehicle powered by an engine having a throttle for controlling the admission of fuel thereto and an intake manifold for distributing air thereto, and having an electrical system including a DC storage battery, an engine driven dynamo with a field winding terminal and an output terminal which normally delivers relatively low voltage DC power to the vehicle electrical system, and a voltage regulator receiving a power input from said DC storage battery and having a field terminal connected to the field winding terminal of said dynamo; the power output accessory unit claimed in claim 20.

26. The combination of claim 25, wherein said dynamo is an alternator.

References Cited

UNITED STATES PATENTS

| | | | |
|---|---|---|---|
| 1,814,577 | 7/1931 | Windle | 290—40 |
| 2,603,673 | 7/1952 | Brake | 307—10 |
| 3,293,443 | 12/1966 | Burch | 307—10 X |
| 3,341,762 | 9/1967 | Rockoff | 320—25 X |

ORIS L. RADER, Primary Examiner

W. E. DUNCANSON, JR., Assistant Examiner

U.S. Cl. X.R.

307—10